Patented Oct. 16, 1945

2,386,968

UNITED STATES PATENT OFFICE 2,386,968

METHOD OF MAKING THERMOPLASTIC COMPOSITIONS AND PRODUCTS OBTAINED THEREBY

George D. Martin, Nitro, W. Va., assignor to Monsanto Chemical Company, St. Louis, Mo., a corporation of Delaware No Drawing. Application January 12, 1942, Serial No. 426,472

24 Claims. (Cl. 260—770)

This invention relates to new thermoplastic compositions derived from rubbers and to the preparation of the same. More particularly this invention relates to new compositions possessing greater resistance to oils and other organic liquids than the rubbers themselves.

In accordance with this invention it has been discovered that new compositions, possessing enhanced resistance to swelling by organic liquids as well as other unusual properties, are obtained by treating a rubber with phosphorus pentachloride or phosphorus pentabromide. The chloride due to its cheapness and availability and superior results obtained therewith is preferred. The new compositions possess properties widely divergent from the original rubber although they undergo a change analogous to vulcanization when strongly heated in the presence of metallic oxides and prior to this change are thermoplastic and amenable to molding and similar operations. However, products can be obtained which, after vulcanization, are very hard and resin like.

It is known that many rubbers, particularly natural rubber, are cyclicized by certain acid catalysts. However, true reaction products of rubber are comparatively unknown. Furthermore, it is difficult to determine when a true chemical reaction has taken place with rubber since some physical combinations are so tightly bound as to be virtually non-separable. While this invention is not limited by any theory or surmise concerning chemical changes occurring during the treatment of the rubber, it is believed that true reaction products of rubber are produced. Both phosphorus and halogen are present in the final products and both play a role in the properties of the new compositions. For example, the same or equivalent compositions can not be prepared by halogenating rubber to the point where the halogen content is equal to that of the phosphorus halide reaction products.

Some of the halogen is only loosely bound so that it is preferred to stabilize the new rubber reaction products by compounding them with zinc oxide or other basic substance. Heating between 130–150° C. for a short time removes much of the active halide and a beneficial effect is derived from masticating the product with caustic soda, sodium carbonate, aniline or the like.

As one important phase of the present invention the rubber is treated with phosphorus pentachloride or bromide and another agent added either at the beginning or during the course of the treatment with the phosphorus penta halide. For convenience, these additional materials will be hereinafter referred to as modifying agents. The modifying agent is found in appreciable quantity in the final product and is to be sharply distinguished from a neutralizing or stabilizing agent which if present at all constitutes a very minor or negligible proportion of the final product, unless of course the stabilizing agent is in the nature of a compounding ingredient like zinc oxide or whiting.

A large number of chemicals have been found to function as modifying agents. This fact can be explained on the basis of the active halogen normally left after treating rubber with phosphorus pentachloride or bromide. While condensed polynuclear aromatic hydrocarbons such as retene are the most useful modifying agents, a variety of other types of compounds can be used. Examples of suitable modifying agents comprise phenols, preferably in the form of their salts such as phenol, sodium phenate, sodium naphthenate, sodium phenate in combination with formaldehyde, o-phenyl potassium naphthenate, di-β-hydroxy naphthyl sulfide, potassium salt of di-β-naphthol, potassium salt of di-β-hydroxy naphthyl methane. Other suitable modifying agents comprise sodium thiocyanate, carbazole, anthracene, abietic acid, retene, phenanthrene, acenaphthene, phenyl diphenyl, poly vinyl alcohol and paraffin. It will be appreciated that the foregoing list is illustrative only and is by no means complete. Useful compositions containing, after washing and drying, at least 20% of the modifying agent have been prepared from all of the modifying agents mentioned above. In some instances the compositions contained on the order of 45% modifying agent. Many other compounds can be used to modify and control the treatment of rubber with phosphorus pentachloride although they can not always be combined in so high a proportion. As further examples may be mentioned tetrahydronaphthalene, naphthalene, diamyl phenol, diamyl hydroquinone, dibutyl catechol, retene oil, di-thiocyanogen, chlorinated paraffin wax, chlorinated diphenyl, potassium thio naphthenate and equivalents and analogues thereof.

A variety of methods of treating a rubber with a phosphorus pentachloride or pentabromide with or without other treating agents can be used. For example the treatment can be carried out on the rolls of an ordinary rubber mill or in a Banbury or other type mixer adapted for handling rubbers or tough rubbery materials. Alternatively, the rubber may be dispersed in an organic solvent, the other reactants added to the cement so prepared and the treatment carried out in a glass or glass lined container like an ordinary chemical reaction. Suitable solvents comprise benzene, xylene, toluene, carbon disulfide, tetrachlorethane, ethylene dichloride, trichloroethylene, chloroform, carbon tetrachloride and chlorobenzene. The properties of the compositions will of course vary according to the conditions of the treatment. In one series of experiments the time of association of the rubber and phosphorus pentachloride was varied from 8 to 48 hours. 100 parts by weight of crepe rubber and an equal weight of phosphorous pentachloride were stirred into benzene and the mixes allowed to stand at room temperature. They were then poured into water to stop the reaction, the solvent removed and the residue washed and dried to constant weight.

| No. | Time | Weight of product based on 100 parts rubber | Properties |
|---|---|---|---|
| 1 | 8 | 123 | Increasing strength and toughness |
| 2 | 16 | 128 | |
| 3 | 24 | 124 | |
| 4 | 40 | 128 | Very tough and rubbery. |
| 5 | ¹40 | 116 | Not quite equal to #4. |
| 6 | 48 | 131 | About the same as #4. |

¹ Treatment carried out at refluxing temperature of a benzene cement.

In general the longer times of treatment at lower temperature give somewhat better results, if tough rubbery products are desired. However, hard resin like materials can be made in a relatively short time at temperatures of 130–150° C. Of course, proper control of the reaction becomes increasingly important at the higher temperatures in order to obtain reproducible results. A product substantially identical with #4 was obtained by letting the charge stand for 24 hours at room temperature followed by heating for two hours at 135° C. in xylene.

The proportion of phosphorus pentachloride can be varied considerably. Thus, in another series of experiments where this was the variable, crepe rubber and the phosphorus pentachloride were dispersed in an organic solvent and allowed to stand 48 hours at room temperature after which the reaction was stopped, the solvent removed and the product washed and dried to constant weight. The weights given in the table are averages of several runs.

| Parts PCl₅ on 100 parts rubber | Weight of product based on 100 parts rubber | Properties |
|---|---|---|
| 25 | 106 | Soft and tacky. |
| 50 | 112 | Rubbery. |
| 75 | 118 | Do. |
| 100 | 125 | Do. |
| 200 | 143 | Hard resin. |

Increasing the proportion of phosphorus pentachloride results in a more or less definite and constant increase in the weight of the product accompanied by a regular progression in properties. The effect gradually falls off after the proportion of phosphorus pentachloride exceeds that of the rubber and very little difference can be detected after the proportion of halide is double that of the rubber.

The following are specific embodiments of the invention, illustrative of the invention and not limitative thereof.

Example I

A rubber cement was prepared by soaking and stirring 100 parts by weight of crepe rubber in benzene or other solvent until a clear homogeneous mixture was produced. To the cement so prepared 50 parts by weight of phosphorus pentachloride was added and the charge heated to refluxing temperature for about eight hours, the solvent being returned to the system by means of a suitable condenser. After the heating period a Liebig type condenser was substituted for the reflux condenser and the solvent distilled off. The residue was thoroughly washed with water or soda ash solution on a rubber washing mill or on other equipment adapted for washing tough plastic products and then dried by milling on a hot mill followed by heating to constant weight in a vacuum oven. In this manner, about 110 parts by weight of a tough plastic product was obtained. A compounded stock composed of 100 parts of this plastic product, 23.4 parts zinc oxide, 5 parts benzothiazyl thio benzoate and 3 parts sulfur (all parts are by weight) was cured in a press by heating 45 minutes at the temperature of 30 pounds of steam pressure per square inch. The sulfur and accelerator can be omitted and almost identical results obtained by curing with zinc oxide alone. The cured stocks were found to be highly resistant to solvents such as kerosene and were in good condition after three weeks immersion therein.

Example II

In the same manner as described in the foregoing example a charge was made up comprising 100 parts by weight of crepe rubber and 100 parts by weight of phosphorus pentachloride. The mixture was stirred until a clear homogeneous mixture was obtained and then allowed to stand 48 hours at room temperature. The solvent was removed and the residue washed and dried all substantially as described in Example I. 131 parts by weight of tough plastic product was obtained. This gave a good cure in 30 minutes when compounded with 30 per cent zinc oxide and heated in a press at the temperature of 30 pounds steam pressure per square inch. The cured product was somewhat harder than that described in Example I and exhibited comparable resistance to kerosene and other solvents.

Example III

A benzene rubber cement was prepared containing 100 parts by weight of crepe rubber. Substantially 50 parts by weight of phosphorus pentachloride was added and the charge heated at refluxing temperature for 4 hours. 50 parts by weight of cresylic acid was added and the heating contitnued for 12 hours. The solvent was removed and the residue washed and dried all substantially as described in Example I. 130 parts by weight of brown tough rubbery product was obtained. A stock comprising 100 parts of this product, 25 parts zinc oxide, 40 parts P-33 Black, 3 parts sulfur, 1 part di-(benzothiazyl thiol) dimethyl urea, 0.25 part diphenyl guanidine and 3 parts stearic acid (all parts by weight) cured nicely in 30 minutes at the temperature of 40 pounds steam pressure per square inch.

Example IV

Substantially 50 parts by weight of phosphorus pentachloride was added to a benzene cement containing 100 parts by weight of crepe rubber.

The charge was heated until the initial reaction had subsided, several hours being required, and 50 parts by weight of the sodium salt of beta naphthol added thereto. Heating was continued for a short time, the solvent removed and the residue washed and dried all substantially as described in Example I. 138 parts by weight of a rather soft yet tough brown rubbery product was obtained. A stock was compounded comprising 100 parts of this product, 25 parts zinc oxide, 40 parts P-33 Black, 4 parts sulfur, 1 part di-(benzothiazyl thiol) dimethyl urea, 0.25 part diphenyl guanidine, 3 parts stearic acid and 2 parts pine tar (all parts by weight). The stock so compounded gave a good cure after heating ten minutes in a press at the temperature of 40 pounds steam pressure per square inch. The cured product possessed a tensile strength of over 1600 lbs./in.$^2$ at an ultimate elongation of 610%. The swelling after 72 hours immersion in kerosene at room temperature was only about half of that of a similar stock compounded from rubber.

*Example V*

Substantially 50 parts by weight of phosphorus pentachloride was added to a benzene cement containing 100 parts by weight of crepe rubber. The charge was heated to refluxing temperature for about an hour and then 100 parts by weight of retene added and the heating continued for 2 hours. The solvent was then removed and the residue washed and dried all substantially as described in Example I. 206 parts by weight of a nearly white somewhat soft rubbery product was obtained. A stock was compounded comprising 100 parts by weight of this product, 25 parts zinc oxide, 40 parts carbon black, 3 parts sulfur, 1.5 parts mercaptobenzothiazole, 3 parts stearic acid and 2 parts pine tar (all parts by weight). The stock cured readily after heating for different periods of time in a press. The cured product possessed a tensile strength over 1200 lbs./in.$^2$ at an ultimate elongation of 400%. The swelling in kerosene was only about half of that of a similar stock compounded from crepe rubber.

*Example VI*

Substantially 100 parts by weight of phosphorus pentachloride was added to a carbon bisulfide cement containing 100 parts by weight of crepe rubber. The charge was heated at refluxing temperature for about 30 minutes, 100 parts by weight of technical retene added and the heating continued for about 12 hours. The solvent was removed and the residue washed and dried all substantially as described in Example I. 214 parts by weight of brown tough rubbery product were obtained. It is to be understood that the solvent employed is not critical since other solvents may be used with comparable effect. For example products identical so far as could be determined were obtained by conducting the treatment in benzene or xylene. A stock was compounded comprising 100 parts by weight of this product, 25 parts zinc oxide, 40 parts Gastex, 3 parts sulfur, 1 part di(benzothiazyl thiol) dimethyl urea, 0.25 part diphenyl guanidine, 3 parts stearic acid, 2 parts pine tar and 1.5 parts of the condensation product of acetone and p-amino diphenyl (all parts are by weight). The stock so compounded was cured by heating in a press for 20 minutes at the temperature of 40 pounds steam pressure per square inch. The cured product was tough and rubbery and was highly resistant to attack by organic solvents. As illustrative of the desirable properties in this respect strips of the cured product were immersed in various solvents and the gain in weight after immersion determined. The results obtained with a typical rubber stock are included for purposes of comparison. A negative figure indicates a loss instead of a gain in weight.

| Solvent | Percent change in weight after 8 days immersion at room temperature | |
|---|---|---|
| | Reaction product | Rubber stock |
| Skellysolve C | 2.5 | 109.0 |
| Gasoline | 4.9 | 128.0 |
| Stoddard solvent | 6.1 | 136.0 |
| Diesel fuel | 6.6 | 126.0 |
| Lubricating oil | −2.5 | 25.2 |
| Paraffin oil | −1.0 | 72.2 |
| Transformer oil | −2.1 | 14.6 |
| Acetone | −14.9 | 117.0 |
| Benzene | 24.2 | 248.0 |
| Carbon tetrachloride | 84.2 | 442.0 |
| Ethyl ether | −4.1 | 80.5 |
| Linseed oil | 4.2 | 27.3 |
| Turpentine | 21.8 | 216.0 |
| Water | 2.2 | 1.1 |

The above data show that the preferred material is highly resistant to organic solvents and is enormously superior to rubber.

*Example VII*

Substantially 50 parts by weight of phosphorus pentachloride was added to a benzene cement containing 100 parts by weight of crepe rubber. The charge was heated to refluxing temperature for 1 hour, 100 parts by weight of phenol added and the heating continued for 3 hours. The solvent was then distilled off and the residue washed and dried all substantially as described in Example I. 148 parts by weight of tough strong plastic product was obtained. The product handled well at 60° C. at which temperature it was easily compounded and could be molded into any shape desired. However, when subjected to heat and pressure in the presence of zinc oxide either with or without accelerator and sulfur a very hard product resulted. For example, 100 parts by weight of the plastic compounded with 32 parts by weight zinc oxide produced a hard molded product after heating 30 minutes at the temperature of 40 pounds of steam pressure per square inch.

*Example VIII*

Substantially 50 parts by weight of phosphorus pentachloride was added to a benzene cement containing substantially 100 parts by weight of crepe rubber. The charge was heated to refluxing temperature for 3 hours, 37 parts by weight of sodium phenate added and the heating continued until the reaction appeared to be complete. In order to increase the hardness of the product it was heated with 100 parts by weight of 40% formaldehyde after removal of the solvent but this is unnecessary unless an exceptionally hard product is desired. The solvent was removed and the residue washed and dried all substantially as described in Example I. 170 parts by weight of a hard thermoplastic product was obtained. 100 parts by weight of this material compounded with 25 parts by weight of zinc oxide or with 25 parts by weight of zinc oxide and 40 parts by weight of P-33 Black gave strong hard compositions after heating 25 minutes at the temperature of 40 pounds steam pressure per square inch.

Example IX

Substantially 200 parts by weight of phosphorus pentabromide was added to a carbon disulfide cement containing 100 parts by weight of crepe rubber. The charge was heated at refluxing temperature for 12 hours, the solvent removed and the residue washed and dried all substantially as described in Example I. 178.5 parts by weight of a hard product was obtained. It possessed good plasticity at 60° C. and stocks were compounded comprising 10%, 15% and 20% zinc oxide. The stocks so compounded were cured in a press and produced very hard cured compositions.

Example X

The charge of Example IX was repeated and after heating for 1 hour, 100 parts by weight of technical retene was added and the heating continued for 12 hours. The solvent was removed, the residue washed and dried all substantially as described in Example I. 287.5 parts by weight of a plastic product were obtained. A stock was compounded comprising 100 parts by weight of this product, 20 parts Gastex, 3 parts stearic acid, 2 parts pine tar, 25 parts zinc oxide, 3 parts sulfur, and 1.0 part mercaptobenzothiazole (all parts are by weight). The stock was cured by heating in a press at the temperature of 30 pounds of steam pressure per square inch. Samples of the cured product were immersed in various solvents and the change in weight noted.

| Solvent | Change in weight after 78 hours immersion at room temperature |
| --- | --- |
| Gasoline | +9.3 |
| Benzene | +15.4 |
| Lubricating oil | −1.0 |

A wide variety of rubbers, both natural and synthetic, are applicable in the present invention. Accordingly, the term "a rubber" is employed in the claims to define a vulcanizable plastic material which possesses high extensibility under load coupled with the property of forcibly retracting to approximately its original size and shape after the load is removed. Typical rubbers which can be used in this invention include for example, crude india rubber, reclaimed rubber, ground scrap, balata, gutta percha, chlor butadiene polymers, butadiene polymers and co-polymers, some of the better known types of which are Perbunan, Hycar, Buna N (said to be co-polymers of butadiene and acrylic nitrile) and Buna S (a co-polymer of butadiene and styrene), guayule, gutta-siac, juletong or pontianac, caucho, kickxia and manihot rubbers, polymerized 2,3 dimethyl butadiene, polymerized 2 phenyl butadiene, polymerized dichlor butadiene and the like whether or not admixed with fillers, pigments, accelerating or vulcanizing agents, or other compounding ingredients.

Again, this invention is not limited to the specific examples and compositions set forth to illustrate the invention. Other fillers, compounding and vulcanizing ingredients than those specifically mentioned can be utilized. Furthermore, the new compositions can be admixed with other plastic or resinous products. This invention is limited solely by the claims attached hereto as part of the present specification.

What is claimed is:

1. The thermoplastic compositions ranging from non-tacky rubbery products to hard resins comprising a conjugated butadiene polymer rubber reaction product of enhanced resistance to swelling by organic solvents and containing phosphorus and halogen in chemical combination obtained by treating a conjugated butadiene polymer rubber with at least about 50 percent by weight on the rubber of a member of the group consisting of phosphorus pentachloride and phosphorus pentabromide.

2. The thermoplastic compositions ranging from non-tacky rubbery products to hard resins comprising a conjugated butadiene polymer rubber reaction product of enhanced resistance to swelling by organic solvents and containing phosphorus and chlorine in chemical combination obtained by treating a conjugated butadiene polymer rubber with at least about 50 percent by weight on the rubber of phosphorus pentachloride.

3. The thermoplastic compositions ranging from non-tacky rubbery products to hard resins comprising a conjugated butadiene hydrocarbon polymer rubber reaction product of enhanced resistance to swelling by organic solvents and containing phosphorus and chlorine in chemical combination obtained by treating a conjugated butadiene hydrocarbon polymer rubber with at least about 50 percent by weight on the rubber of phosphorus pentachloride and a modifying agent selected from the group consisting of phenols and polynuclear aromatic hydrocarbons, a substantial proportion of said modifying agent remaining in the product.

4. The thermoplastic compositions ranging from non-tacky rubbery products to hard resins comprising a conjugated butadiene hydrocarbon polymer rubber reaction product of enhanced resistance to swelling by organic solvents and containing phosphorus and chlorine in chemical combination obtained by treating a conjugated butadiene hydrocarbon polymer rubber with at least about 50 percent by weight on the rubber of phosphorus pentachloride and a polynuclear aromatic hydrocarbon, a substantial proportion of which remains in the product.

5. The thermoplastic compositions ranging from non-tacky rubbery products to hard resins comprising a conjugated butadiene hydrocarbon polymer rubber reaction product of enhanced resistance to swelling by organic solvents and containing phosphorus and chlorine in chemical combination obtained by treating a conjugated butadiene hydrocarbon polymer rubber with at least about 50 percent by weight on the rubber of phosphorus pentachloride and retene, a substantial proportion of retene remaining in the product.

6. A rubbery non-tacky thermoplastic product comprising a conjugated butadiene hydrocarbon polymer rubber reaction product of enhanced resistance to swelling by organic solvents containing phosphorus and chlorine in chemical combination obtained by treating a conjugated butadiene hydrocarbon polymer rubber with at least 50 but not more than 100 parts by weight of phosphorus pentachloride per 100 parts by weight of rubber and retene not exceeding the weight of the rubber, a substantial proportion of retene remaining in the product.

7. A rubbery non-tacky thermoplastic product comprising a conjugated butadiene hydrocarbon polymer rubber reaction product of enhanced resistance to swelling by organic solvents containing phosphorus and chlorine in chemical combination obtained by treating a conjugated butadiene hydrocarbon polymer rubber with at least 50 but not more than 100 parts by weight of phosphorus pentachloride per 100 parts by weight of rubber and after the initial reaction has subsided, adding retene in a proportion not exceeding the amount of the rubber and combining a substantial proportion of retene into the product.

8. A rubbery non-tacky thermoplastic product comprising a conjugated butadiene hydrocarbon polymer rubber reaction product of enhanced resistance to swelling by organic solvents containing phosphorus and chlorine in chemical combination obtained by treating a conjugated butadiene hydrocarbon polymer rubber with substantially 100 parts by weight of phosphorus pentachloride and 100 parts by weight of retene per 100 parts by weight of rubber and combining a substantial proportion of the retene into the product.

9. A non-tacky thermoplastic product comprising a natural rubber reaction product of enhanced resistance to swelling by organic solvents containing phosphorus and chlorine in chemical combination obtained by treating natural rubber with at least about 50 percent by weight on the rubber of phosphorus pentachloride and having a basic material compounded therewith sufficient to overcome acidity and stabilize the product.

10. A non-tacky thermoplastic product comprising a natural rubber reaction product of enhanced resistance to swelling by organic solvents containing phosphorus and chlorine in chemical combination obtained by treating natural rubber with at least about 50 percent by weight on the rubber of phosphorus pentachloride and a polynuclear aromatic hydrocarbon, a substantial proportion of polynuclear aromatic hydrocarbon remaining in the product.

11. A rubbery non-tacky thermoplastic product comprising a natural rubber reaction product of enhanced resistance to swelling by organic solvents containing phosphorus and chlorine in chemical combination obtained by treating natural rubber with at least 50 but not more than 100 parts by weight of phosphorus pentachloride per 100 parts by weight of rubber and retene not exceeding the weight of the rubber, said composition containing both phosphorus and chlorine as well as a substantial proportion of retene.

12. A rubbery non-tacky thermoplastic product comprising a natural rubber reaction product of enhanced resistance to swelling by organic solvents containing phosphorus and chlorine in chemical combination obtained by treating natural rubber with substantially 100 parts by weight of phosphorus pentachloride and 100 parts by weight of retene per 100 parts by weight of rubber and combining phosphorus and chlorine as well as a substantial proportion of retene into the product.

13. The method of making a thermoplastic composition of enhanced resistance to swelling by organic solvents which comprises treating a conjugated butadiene polymer rubber with at least about 50 parts by weight on the rubber of a member of the group consisting of phosphorus pentachloride and phosphorus pentabromide to partially halogenate the rubber and combine phosphorus therewith.

14. The method of making a thermoplastic composition of enhanced resistance to swelling by organic solvents which comprises treating a conjugated butadiene polymer rubber with at least about 50 percent by weight on the rubber of phosphorus pentachloride to partially chlorinate the rubber and combine phosphorus therewith.

15. The method of making a thermoplastic composition of enhanced resistance to swelling by organic solvents which comprises treating a conjugated butadiene hydrocarbon polymer rubber with at least about 50 percent by weight on the rubber of phosphorus pentachloride and a modifying agent selected from the group consisting of phenols and aromatic polynuclear hydrocarbons and combining chlorine, phosphorus and a substantial proportion of said modifying agent with the rubber.

16. The method of making a thermoplastic composition of enhanced resistance to swelling by organic solvents which comprises treating a conjugated butadiene hydrocarbon polymer rubber with at least about 50 percent by weight on the rubber of phosphorus pentachloride and a polynuclear aromatic hydrocarbon and combining chlorine, phosphorus and a substantial proportion of polynuclear aromatic hydrocarbon with the rubber.

17. The method of making a thermoplastic composition of enhanced resistance to swelling by organic solvents which comprises treating a conjugated butadiene hydrocarbon polymer rubber with at least about 50 percent by weight on the rubber of phosphorus pentachloride and retene and combining chlorine, phosphorus and a substantial proportion of retene with the rubber.

18. The method of making a thermoplastic composition of enhanced resistance to swelling by organic solvents which comprises treating a conjugated butadiene hydrocarbon polymer rubber with at least 50 but not more than 100 parts by weight of phosphorus pentachloride per 100 parts by weight of rubber and retene not exceeding the weight of the rubber and combining chlorine, phosphorus and a substantial proportion of retene with the rubber.

19. The method of making a thermoplastic composition of enhanced resistance to swelling by organic solvents which comprises treating a conjugated butadiene hydrocarbon polymer rubber with at least 50 but not more than 100 parts by weight of phosphorus pentachloride per 100 parts of rubber and after the initial reaction has subsided adding retene in a proportion not exceeding the amount of the rubber, mixing thoroughly and isolating a homogeneous reaction product of the said butadiene polymer rubber containing phosphorus, chlorine and a substantial proportion of retene.

20. The method of making a thermoplastic composition of enhanced resistance to swelling by organic solvents which comprises treating a conjugated butadiene hydrocarbon polymer rubber with substantially 100 parts by weight of phosphorus pentachloride and 100 parts by weight of retene per 100 parts by weight of rubber, mixing thoroughly and isolating a homogeneous reaction product of the said butadiene polymer rubber containing phosphorus, chlorine and a substantial proportion of the retene.

21. The method of making a thermoplastic composition of enhanced resistance to swelling by organic solvents which comprises treating natural rubber with at least about 50 percent by weight on the rubber of phosphorus pentachloride to partially chlorinate the rubber and combine phosphorus therewith.

22. The method of making a thermoplastic composition of enhanced resistance to swelling by organic solvents which comprises treating natural rubber with at least about 50 percent by weight on the rubber of phosphorus pentachloride and a polynuclear aromatic hydrocarbon and combining phosphorus, chlorine and a substantial proportion of polynuclear aromatic hydrocarbon with the rubber.

23. The method of making a thermoplastic composition of enhanced resistance to swelling by organic solvents which comprises treating natural rubber with at least 50 but not more than 100 parts by weight of phosphorus pentachloride per 100 parts of rubber and retene in a proportion not exceeding the amount of the rubber to partially chlorinate the rubber and combine phosphorus therewith and a substantial proportion of retene.

24. The method of making a thermoplastic composition of enhanced resistance to swelling by organic solvents which comprises treating natural rubber with substantially 100 parts by weight of phosphorus pentachloride and 100 parts by weight of retene per 100 parts by weight of rubber and isolating a homogeneous reaction product of the said rubber containing phosphorus, chlorine and a substantial proportion of the retene.

GEORGE D. MARTIN.